United States Patent [19]

Greidinger et al.

[11] 4,089,899

[45] May 16, 1978

[54] FERTILIZER COMPOUND OF THE UREAFORM TYPE AND A METHOD FOR THE PRODUCTION THEREOF

[75] Inventors: Dahlia Simeona Greidinger, Haifa; Liuba Cohen, Kiryat Bialik, both of Israel

[73] Assignee: Fertilizers & Chemicals Limited, Haifa, Israel

[21] Appl. No.: 670,683

[22] Filed: Mar. 26, 1976

[30] Foreign Application Priority Data

Apr. 22, 1975 Israel ........................................ 47144

[51] Int. Cl.² .................... C07C 127/15; C05C 00/00
[52] U.S. Cl. ..................... 260/553 R; 71/28
[58] Field of Search .................. 260/553 R; 71/28, 30

[56] References Cited

U.S. PATENT DOCUMENTS

| | | | |
|---|---|---|---|
| 2,415,705 | 2/1947 | Rohner et al. | 260/553 R X |
| 2,502,996 | 4/1950 | Rohner et al. | 260/553 R X |
| 2,592,809 | 4/1952 | Krelovec et al. | 260/553 R X |
| 2,644,806 | 7/1953 | Kise | 260/553 R X |
| 2,766,283 | 10/1956 | Darden | 71/28 X |
| 2,830,036 | 4/1958 | O'Donnell | 71/30 X |
| 2,916,371 | 12/1959 | O'Donnell | 71/28 |
| 3,150,955 | 9/1964 | Smith | 71/28 |
| 3,231,363 | 1/1966 | Renner | 71/30 X |
| 3,333,940 | 8/1967 | Ridgeway | 71/28 X |
| 3,712,879 | 1/1973 | Strickrodt et al. | 71/28 X |
| 3,759,687 | 9/1973 | Nobell | 71/28 |
| 3,870,755 | 3/1975 | Kamo et al. | 260/553 R |
| 3,970,625 | 7/1976 | Moore et al. | 71/30 X |

*Primary Examiner*—Daniel E. Wyman
*Assistant Examiner*—Thomas A. Waltz
*Attorney, Agent, or Firm*—John S. Roberts, Jr.

[57] ABSTRACT

The present invention relates to a new fertilizer compound of the ureaform type and to a method for the production thereof. The new ureaform compound is characterized by the low average degree of polymerization between urea and formaldehyde. The new compound has a nitrogen content of over 41% by weight and consists of cold water soluble nitrogen as the main fraction and cold water insoluble as the second fraction which is substantially free of hot water insoluble nitrogen. The new ureaform compound is obtained by the condensation of urea and formaldehyde at a correct ratio between the reagents and termination of the reaction at a stage wherein excessive polymerization is prevented. The reaction is carried out in a controlled system with a pH in the range of 3.5 to 4.2. Particularly useful are the systems $H_3PO_4$-$KH_2PO_4$ and $H_3PO_4$-$NH_4H_2PO_4$. The new compound successfully combines the advantage of both mineral water soluble nitrogen fertilizers and organic water insoluble slow-release nitrogen sources.

6 Claims, 2 Drawing Figures

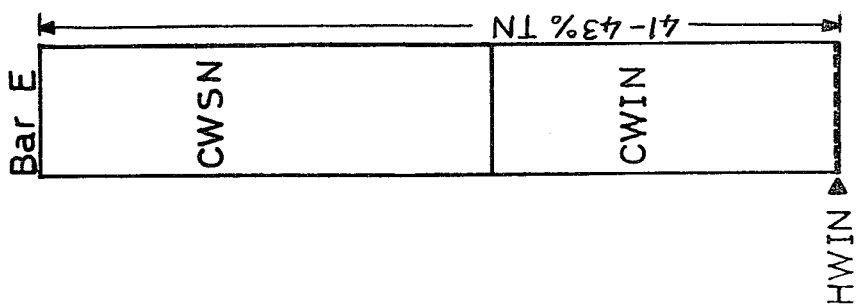
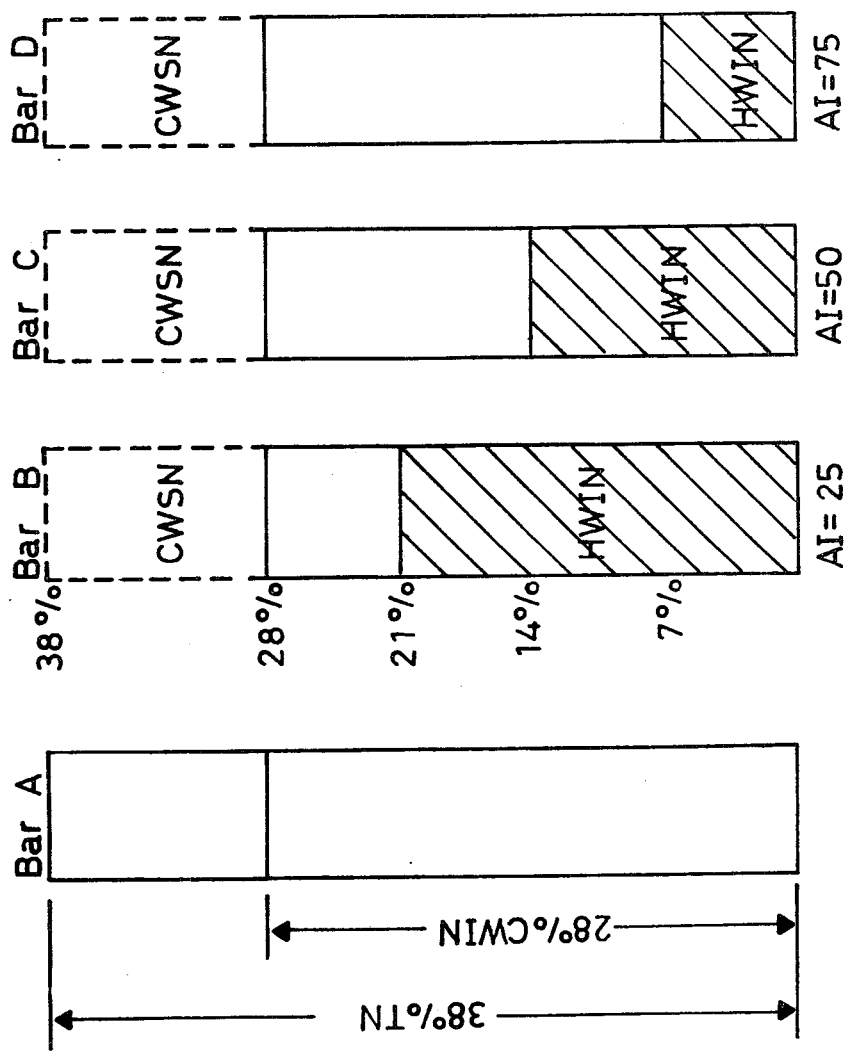

FERTILIZER COMPOUND OF THE UREAFORM TYPE AND A METHOD FOR THE PRODUCTION THEREOF

The present invention relates to a new fertilizer compound of the ureaformaldehyde type material called ureaform, and to a method for the production thereof.

Ureaform is the generic name for the solid fertilizer grade ureaformaldehyde condensates which were developed to provide a controlled release of nitrogen to growing plants. In 1964, the Association of American Fertilizer Control Officials adopted the following definition for ureaform fertilizer: "Urea-formaldehyde fertilizer materials are reaction products of urea and formaldehyde containing at least 35% nitrogen, largely in insoluble but slowly available form. The water-insoluble nitrogen shall be at least 60% of the total nitrogen. The water-insoluble nitrogen in these products shall have an activity of not less than 40% when determined by the appropriate AOAC method."(New Fertilizer Materials, Ureaform, Noyes Publication, 1968, page 1).

Ureaform is a mixture of methylene urea polymers having a range of molecular weights. Such products which are now commercially available have two major characteristic features:

(1) The ratio of urea to methylene groups in the ureaform is about 6 to 5 and not above 5 to 4.

(2) The products consist of three distinct fractions — water soluble nitrogen, cold water insoluble nitrogen which is hot water soluble, and hot water insoluble nitrogen — which are approximately equal in amount.

The first fraction of ureaform contains cold water soluble nitrogen (CWSN) and constitutes about a third but not more than 40% of the total nitrogen. The second and third fractions constitute together two thirds and not less than 60% of the total nitrogen. Thus, the second fraction contains the cold water insoluble nitrogen (CWIN) which is hot water soluble, and constitutes the real source of slow-release nitrogen fertilizer. The third fraction contains hot water insoluble nitrogen (HWIN) and is actually the least useful ureaform fertilizer fraction, being characterized by a very slow rate of nitrification. According to J. Agr. Food Chem., Vol. 15, No. 6, 967-970, 1967, this fraction was qualified to be of no practical value in agricultural use due to its low mineralization rate of only 10% per year.

An adequate qualitative definition of the slow release nitrogen fertilizer fraction is reflected by the concept of "Activity Index" (AI) as determined by chemical analysis. The activity index is defined:

$$AI = \frac{\%CWIN - \%HWIN}{\%CWIN} \cdot 100$$

Thus, the activity index shows the relative amount of the cold water insoluble portion soluble in hot water. A low activity index indicates a poor quality ureaform product, being characterized by a high value of HWIN, whereas a high activity index indicates a better product characterized by a low value of HWIN.

A graphical illustration of the known ureaform materials is presented in FIG. 1. Bar A represents a sample of ureaform having a total nitrogen of 38% and cold water insoluble nitrogen 28%. Bars B, C and D represent the compositions of ureaform having an AI of 25, 50 and 75 respectively, the hot water insoluble nitrogen decreasing accordingly.

The agronomic value of ureaform as a source of a long feeding nitrogen has been defined by Sauchelli, a well-known scientist in this field, as depending on two factors:

(1) The quantity of cold water insoluble nitrogen which is the source of slowly available nitrogen, and (2) The quality of the cold water insoluble nitrogen as determined by the activity index reflecting the rate at which the cold water insoluble nitrogen becomes available.

In view of the above, all known developed processes in the ureaform field have been directed to achieve two major goals:

(a) a high yield of CWIN and (b) a high quality CWIN fraction which has a minimal amount of HWIN. Therefore, all commercial ureaform materials contain the CWIN fraction as the major component (about 28% N) but the HWIN fraction still amounts to about half the CWIN (about 14% N).

It is the object of the present invention to provide a new fertilizer compound of the ureaform type. It is another object of the present invention to provide a new fertilizer compound of ureaform type which consists essentially of only two nitrogen fractions. It is still another object of the present invention to provide a new fertilizer compound in which the ratios between the fractions are completely reversed to those known from commercial ureaform materials. The invention consists of a new compound of ureaform type comprising the condensation of urea and formaldehyde, being characterized by a nitrogen content of over 41% by weight, consisting of cold water soluble nitrogen as the main fraction and cold water insoluble nitrogen as the second fraction which is substantially free of hot water insoluble nitrogen.

A typical specification of the new ureaform compound according to the present invention is as follows:

Total nitrogen: 41–43%
Cold water insoluble nitrogen: 16–18%
Hot water insoluble nitrogen: 0–2%

The nature of the overall reaction mechanism which permits the preparation of the ureaform compound according to the present invention has not been fully elucidated owing to the complex reaction possibilities of the starting and intermediate products. The scheme of the reactions involved comprises initially of the condensation of urea with formaldehyde followed by subsequent reaction of the methylol urea with a new molecule of urea, resulting in methylol diurea and so on, according to the following equation:

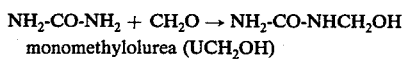
$NH_2\text{-CO-}NH_2 + CH_2O \rightarrow NH_2\text{-CO-NHCH}_2OH$
monomethylolurea ($UCH_2OH$)

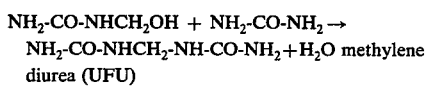
$NH_2\text{-CO-NHCH}_2OH + NH_2\text{-CO-}NH_2 \rightarrow$
$NH_2\text{-CO-NHCH}_2\text{-NH-CO-}NH_2 + H_2O$ methylene diurea (UFU)

$UFU + UCH_2OH \rightarrow UFUFU + H_2O$ dimethylene triurea (UFUFU)

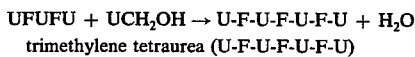
$UFUFU + UCH_2OH \rightarrow U\text{-}F\text{-}U\text{-}F\text{-}U\text{-}F\text{-}U + H_2O$
trimethylene tetraurea (U-F-U-F-U-F-U)

U-F-U-F-U-F-U ± UCH$_2$OH →
U-F-U-F-U-F-U-F-U + H$_2$O tetramethylene pentaurea

The ureaform compound according to the present invention is a mixture of the above reaction products being substantially free of polymethylene ureas higher than tetramethylene pentaurea.

Further details on the theoretical aspects of the formation of the new ureaform compound are beyond the scope of the present invention.

An important characteristic feature of the new ureaform compound is the low average degree of polymerization between urea and formaldehyde, wherein the term 'degree of polymerization' means the ratio between the urea and formaldehyde residues in the final product. Whereas, in the known ureaform materials, the average degree of polymerization is generally 6 to 5 and never higher than 5 to 4, in the new ureaform compound, this ratio is substantially 3 to 2 and never lower than 4 to 3.

The new compound of ureaform is an odourless white solid having an amorphous state. It is dustless and thus can be easily handled for agricultural purposes. It consists essentially of only two fractions: water soluble nitrogen and cold water insoluble nitrogen. The water soluble nitrogen fraction amounts to about 60% of the total nitrogen. It consists largely of methylene diurea and dimethylene triurea and contains some residual urea. The cold water insoluble nitrogen fraction in the new ureaform compound, which amounts to about 40% of the total nitrogen, consists largely of trimethylene tetraurea and tetramethylene pentaurea. In contrast to the known ureaform materials on the market, this fraction is virtually entirely soluble in hot water, a fact which increases the quality of the new compound of controlled release fertilizer.

It appears, therefore, that this compound does not even fall under the currently accepted definition of ureaform fertilizer adopted by AOAC regarding the nitrogen fraction compositions as quoted on page 1 of the specification. In FIG. 2, a graphical illustration is given of the new ureaform compound. By comparing the bar E given in FIG. 2 with the bars presented in FIG. 1, the differences between the compounds appear in a very distinct form; the water soluble nitrogen is the main fraction while the water insoluble nitrogen, substantially free of hot water insoluble nitrogen, is the second fraction.

The process by which the new ureaform compound can be obtained is either the diluted solution process or the concentrated solution process, the two main processes by which known ureaform materials are manufactured. The diluted solution process involves the use of an acid catalyst and mild temperatures for the condensation of a dilute solution of urea with formaldehyde. At an appropriate point, the acidic aqueous solution is neutralized and the suspended ureaform obtained in the reaction mass is filtered, granulated and dried; the mother liquor is used to dissolve additional urea and formaldehyde and recycled. The concentrated solution process involves the addition of crystalline urea to an aqueous solution of formaldehyde. The pH is adjusted with acid and, after mixing, the ureaform produced is neutralized and dried.

Important features which characterize the method by which the new ureaform compound is produced are the correct ratio of urea to formaldehyde in the reaction stage to obtain the desired average ratio of urea to formaldehyde in the product and termination of the reaction in the system at an appropriate stage to avoid excessive polymerization. As known, condensation products from pentamethylene hexaurea and hexamethylene heptaurea are completely hot water insoluble and thus, by preventing their formation, the new ureaform compound can be obtained. When the requisite degree of polymerization is achieved, the reaction is terminated, for example, by destruction of the catalyst activity by a pH adjustment and removal of the reaction product from the reaction mixture.

This method involves a controlled reaction system which permits the formation of the new ureaform compound with a low average degree of polymerization, the ratio in the product being substantially 3 urea residues to 2 methylene groups and not lower than 4 to 3. The parameters involved in the control of the reaction system are: ratio between reactants, reaction temperature, reaction time, concentration of reactants and pH in the system.

In the concentrated process, the ratio between the reactants is, of course, the ratio found in the product. In the dilute process, the ratio between the reactants is generally in the range of 2 moles urea to 1 mole formaldehyde and 3 moles urea to 2 moles formaldehyde. Overall concentration of the reactants is between 25% and 40% by weight. The temperature of the reaction is between about 20° C to about 40° C and preferably 22° C to 32° C as normally encountered in the condensation between urea and formaldehyde in the manufacture of ureaform. The pH of the reaction system may either be alkaline at the beginning, followed by acidic adjustment, or be directly in an acidic range from the beginning. According to a preferred method, the preparation of the new ureaform compound is carried out in a controlled solution medium with a pH in the range of 3.5 to 4.2. The controlled solution medium used may be any known combination of acid and acid salt used for this pH range such as $H_3PO_4$-$MeH_2PO_4$ (Me being an alkali metal), organic acids and salts etc. In particular the system $H_3PO_4$-$KH_2PO_4$ and $H_3PO_4$-$NH_4H_2PO_4$ are useful for agricultural purposes. This controlled range acidity, facilitates precise control of the reaction system and the obtaining of the new ureaform compound in a very high yield. The reaction time is generally between about 2 hours and about 4 hours.

The new compound of ureaform fertilizer produced according to the present invention is a controlled release fertilizer which possesses outstanding agronomic qualities, successfully fulfilling the long-felt need for such nutritional materials. Greenhouse pot test experiments have shown that the new compound of ureaform is an efficient slow-release fertilizer in cold climates under conditions wherein known ureaform fertilizers have a low overall availability. It can also be used as a medium-release fertilizer at higher temperatures, acting as a controlled-release fertilizer with a very high degree of availability.

The new compound of ureaform seems to be ideal for plants having a steady and prolonged need for nitrogen fertilizer. It successfully combines the advantages of both mineral water soluble nitrogen fertilizers and organic water insoluble slow-release nitrogen sources. The total availability of nitrogen in the new ureaform compound has been found to be equal and even to surpass the nitrogen availability in known water soluble nitrogen fertilizers and, at the same time, it has the great advantages of both safe and non-burning characteristics, without being immediately leached out.

Crop yield results which were obtained with the new ureaform compound, commercial ureaform (38% total nitrogen, 27% cold water insoluble nitrogen and 13.5% hot water insoluble nitrogen) and ammonium nitrate are summarized hereinafter. The pot experiments were carried out with the above comparative materials top dressed to rye grass. Three soils were used and dry matter assessments of rye grass made at each of six outs over a period of 150 days at a temperature range of 15°-20° C. The soils used have the following properties:

| Texture | pH | $P_2O_5$ (ppm) | $K_2O$ (ppm) | $CaCO_3$ (%) | Organic Carbon |
|---|---|---|---|---|---|
| 1. Sandy Clay Loan | 7.6 | 106 | 360 | 24.2 | 2.08 |
| 2. Sandy Loan | 7.3 | 85 | 98 | 0.2 | 1.73 |
| 3. Clay | 7.6 | 150 | 412 | 5.6 | 2.13 |

The pot technique used was pure soil in 12.7 on plastic pots with overall application of: 0.2 g $P_2O_5$/pot (single superphosphate) 0.2 g $K_2O$/pot (sulphate of potash)

The pattern of responses was very similar in each soil and therefore are presented as means of the soils in the following Table 1.

Table 1

| Comparative results with some nitrogen fertilizers (top dressed) | | | | | | |
|---|---|---|---|---|---|---|
| | Fertilizer used | days from application | | | | |
| | | 14 | 32 | 54 | 95 | 150 |
| Response g/pot | Ammonium nitrate | 1.3 | 3.75 | 4.4 | 4.8 | 4.95 |
| | Unreaform (present invention) | 0.8 | 3.4 | 4.6 | 5.55 | 5.9 |
| | Ureaform (commercial form) | 0.4 | 1.1 | 1.65 | 2.4 | 2.7 |

The results show that, in the first 32 days, the new ureaform compound gives similar crop yields to ammonium nitrate, being much higher than with the commercial ureaform material. After 95 days, the new ureaform compound even surpasses the crop yields obtained with ammonium nitrate, known as an excellent fertilizer. Compared with commercial ureaform, it gives over the whole period 2 to 3 times the crop yield obtained.

The new ureaform compound can be used for various fertilizer applications incorporated into the multinutrient type fertilizer products to meet specific needs. It can also be used alone for speciality fertilizer applications. This constitutes another important advantage of the new ureaform compound since most of the ureaform products known to date contain nitrogen in such a form that it is not sufficiently available and does not have the right pattern for direct utilization by the growing plant. It can be used on turfgrass, ornamental plants and certain cash crops.

The new compound of ureaform is also very efficient non-protein nitrogen which is more available to the rumen microorganisms than the known products. It is also less toxic than urea since the ureaform contains the urea combined with methylene groups.

The preparation of the new ureaform compound is very simple to carry out. A solution of urea is mixed with a formaldehyde solution, taking care that the ratio of urea to formaldehyde is about 3 to 1 and preferably 2:1. The condensation is carried out at ambient temperature and the reaction is stopped by neutralizing the reaction mixture to a pH of about 7 to 10 with an alkaline solution. The product is filtered and dried, and the mother liquor is reused with new portions of urea and formaldehyde solutions. Thus, the overall yield is substantially quantitative. The process can be carried out in a continuous manner also.

In order to illustrate the nature of this invention and the manner of practicing the same, the following examples are presented for clearness of understanding only, and no limitations should be understood therefrom, since modifications to the process for carrying out the invention will be obvious to those skilled in the art.

EXAMPLE 1

(by the diluted solution process)

Urea and formaldehyde were reacted in a mole ratio of 2 to 1. 100 g urea were dissolved in 250 ml water and 68 g formaldehyde (36.8% $CH_2O$) were added. The pH of the solution obtained was corrected by some drops of 10% KOH to pH 8.5. After 15 minutes of stirring, the pH of the reaction mixture was adjusted to 3.8 by 10% $H_3PO_4$. The polymerization process was carried out at 25°-28° C for 3 hours by stirring, then neutralized to pH 8.5 with 10% KOH. The final product was filtered and dried at 65° C, amounting to 64.5 g of dry ureaform. The amount of filtrate was 225 ml. The yield amounts to 98% owing to the continuous reuse of the filtrate solution. The product obtained had the following composition:

Total Nitrogen: 42%
CWIN: 17%
HWIN: 1%

EXAMPLE 2

Ureaformaldehyde was prepared as in Example 1. Instead of water, a mixture of 225 ml filtrate from Example 1 and 25 ml water was used. The resultant filtrate contained 190 ml solution. The final product yielded 96 g dry ureaform having a composition as in Example 1.

EXAMPLE 3

Ureaformaldehyde was prepared as in Example 1. As a solvent, a mixture of 190 ml filtrate from Example 2 and 60 ml water was used. The resultant filtrate contained 180 ml solution. The final product yielded 96.5 g dry ureaform and had the same composition as in Example 1.

EXAMPLE 4

Ureaformaldehyde was prepared as in Example 1. As a solvent, a mixture of 180 ml filtrate from Example 3 and 70 ml water was used. The resultant filtrate contained 185 ml solution. The final product yielded 119 g dry ureaform and had the same composition as in Example 1.

EXAMPLE 5

Ureaformaldehyde was prepared as in Example 1. As a solvent, a mixture of 185 filtrate from Example 4 and 65 ml water was used. The resultant filtrate contained 190 ml solution. The final product yielded 83.5 g dry ureaform and had the same composition as in Example 1. The maximum yield was obtained in Example 4 due to the continuous reuse of the filtrate solution.

EXAMPLE 6

(by the concentrated solution process)

Urea and formaldehyde were reacted in a mole ratio of 3 to 2. 100 g urea were dissolved in 150 ml water and 90 g formaline were added (pH 4.8). The pH of the reaction mixture was corrected to 3.8 by some drops of 20% $H_3PO_4$. The polymerization process was carried out at 25°–28° C for 4 hours by stirring, then neutralized with 20% KOH and dried at 65° C. The product obtained had the following composition:

Total Nitrogen: 42.8%
CWIN: 17.4%
HWIN: 2%

We claim:

1. A new compound of ureaform type prepared at a controlled reaction system, comprising the acid condensation of urea and formaldehyde, being characterized by a nitrogen content of over 41% by weight, consisting of cold water soluble nitrogen of about 60% of the total nitrogen as the main fraction and cold water insoluble nitrogen as the second fraction of about 40% of the total nitrogen and which is substantially free of hot water insoluble nitrogen and further characterized by the average degree of polymerization between the urea and formaldehyde residues being about 3 to 2 and not lower than 4 to 3, the overall concentration of the starting reagents being between 20% and about 40% by weight and the reaction being terminated prior to the formation of methylene urea products higher than tetramethylene pentaurea.

2. A new compound of ureaform according to claim 1, which has the following analysis:

Total Nitrogen: 41–43%
Cold Water Insoluble Nitrogen: 16–18%
Hot Water Insoluble Nitrogen: 0–2%.

3. A method for the production of a new compound of ureaform according to claim 1, which comprises the acid condensation of urea and formaldehyde at a temperature of about 20°–40° C, being characterized by terminating the condensation prior to the formation of methylene urea products higher than tetramethylene pentaurea wherein the overall concentration of the starting reagents is between 20% to about 40% by weight.

4. A method for the production of a new compound of ureaform type according to claim 3, carried out by the dilute solution process or the concentrated solution process.

5. A method for the production of a new compound of ureaform type according to claim 3, wherein the ratio of the starting reagents is between 3 to 2 moles urea to 2 to 1 mole formaldehyde.

6. A method for the production of a new compound of ureaform type according to claim 3, wherein the pH of the reaction system is controlled in the range of 3.5 to 4.2.

* * * * *